United States Patent Office

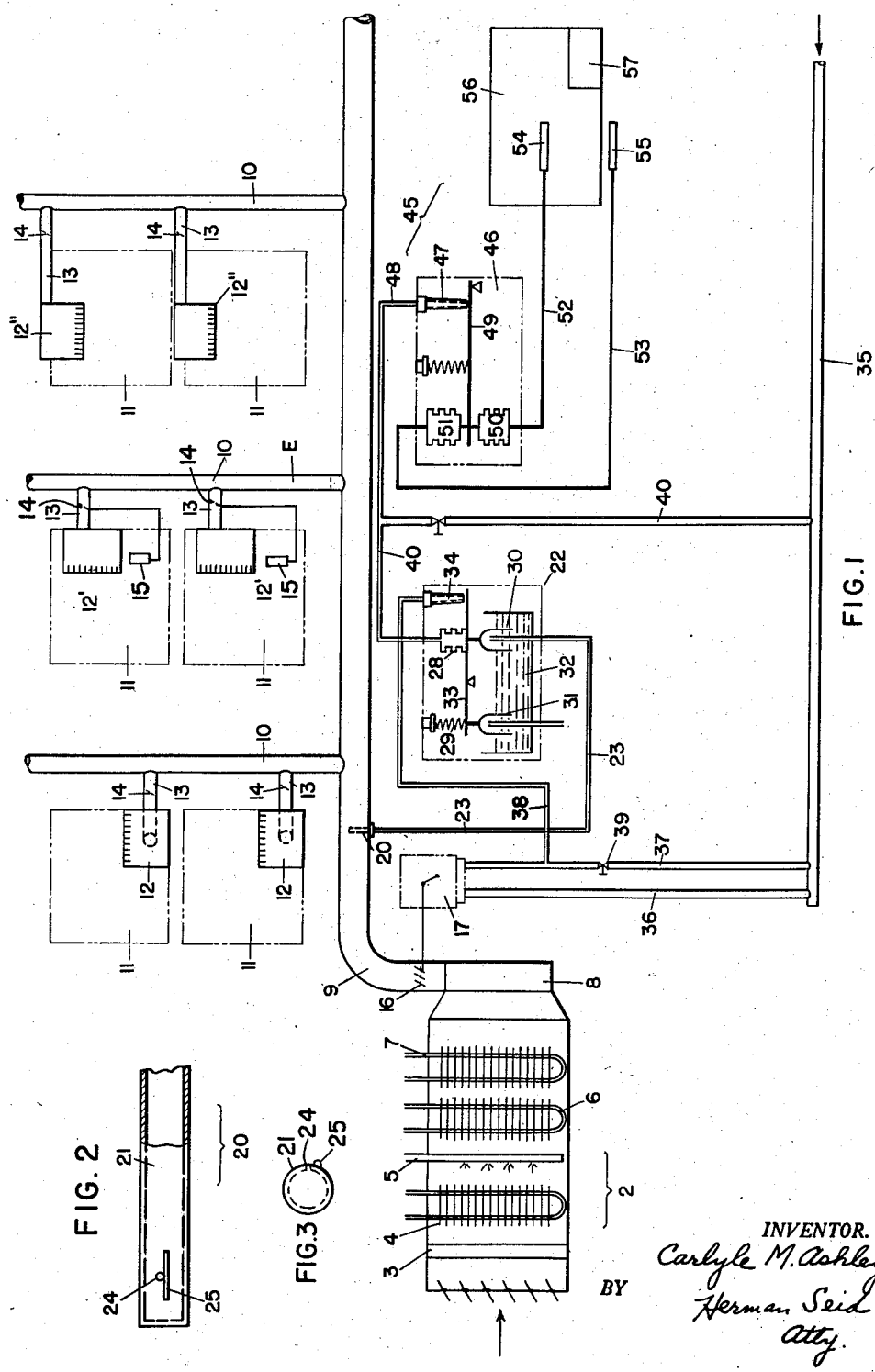
July 28, 1959　　　C. M. ASHLEY　　　2,896,850
AIR CONDITIONING CONTROL SYSTEM
Filed April 27, 1953
INVENTOR.
Carlyle M. Ashley
BY Herman Seid
Atty.

2,896,850
Patented July 28, 1959

2,896,850

AIR CONDITIONING CONTROL SYSTEM

Carlyle M. Ashley, Fayetteville, N.Y., assignor to Carrier Corporation, Syracuse, N.Y., a corporation of Delaware Application April 27, 1953, Serial No. 351,164

3 Claims. (Cl. 236—92)

This invention relates to air conditioning systems and, more particularly, to an air conditioning system provided with regulating mechanism to maintain the volume of conditioned air supplied to a particular unit or outlet substantially constant regardless of adjustments made at other units or outlets during operation of the system, by maintaining a desired static pressure in the branches or risers.

Heretofore, mechanism to maintain desired static pressure in the risers of an air conditioning system was cumbersome and expensive. No commercial system known to me was completely satisfactory since all mechanism so employed resulted in unbalancing the system to a greater or less degree when the volume of conditioned air supplied to any area of the structure being conditioned was varied after initial balancing of the system by the adjustment of dampers by occupants to control room temperature. Such unbalancing of the system caused uncomfortable conditions in other areas of the structure being conditioned and frequently increased the expenses of operation. These disadvantages are enhanced if the air conditioning system be of the type disclosed in my Patent No. 2,609,743 granted September 9, 1952, in which variation in volume of secondary air supplied to each area of the system is contemplated to provide for variation in amount of sensible heat loads present in each area.

The chief object of the present invention is to provide an air conditioning system for a multi-room building which includes a static pressure regulating system to maintain the volume of conditioned air supplied to a particular unit or outlet substantially constant regardless of adjustments made at other units or outlets during operation of the system by maintaining a desired static pressure in the branches of the system.

An object is to provide an air conditioning system for a multi-room building which includes a static pressure regulating system which automatically varies the volume of air supplied to the branches of the system to maintain a desired static pressure therein when the volume of conditioned air supplied in any room is varied.

A further object is to provide an air conditioning system for a multi-room building designed in accordance with the principle of static pressure regain which contains a static pressure regulating system responsive to a pressure in the header of the system substantially equivalent to a desired static pressure in the branches of the system which functions automatically in response to change in such pressure to vary the volume of the air supplied to the branches of the system thus maintaining substantially constant the volume of air supplied to a room by a particular outlet regardless of adjustment of other outlets of the system. Other objects of the invention will be readily perceived from the following description.

This invention relates to an air conditioning system for building structures which comprises, in combination, a central station for conditioning air for supply to areas to be conditioned, units in at least some of the areas being conditioned to supply conditioned air to the area, a header connected to the central station, means to provide conditioned air to the header, branches connected to the header, run-outs connecting the branches with the units, and means for maintaining substantially constant the volume of conditioned air supplied to a unit regardless of adjustment of other units by maintaining a desired static pressure in the branches.

This invention further relates to a method of maintaining a desired static pressure in the branches of an air conditioning system designed in accordance with the principle of static pressure regain in which the steps consist in computing the difference between static pressure in the header upstream of the first branch and static pressure at a desired point in a branch under maximum operating conditions, arranging a pressure sensing instrument in the header to reflect a pressure substantially equivalent to the static pressure at the desired point in the branch, and varying the volume of air supplied to the header responsive to the pressure reflected by the measuring instrument to maintain desired static pressure in the branches.

The attached drawing illustrates a preferred embodiment of the invention, in which—

Figure 1 is a diagrammatic view of an air conditioning system for a building structure embodying the present invention;

Figure 2 is a sectional view of the sensing probe of the static pressure regulator; and Figure 3 is an end view of the sensing probe shown in Figure 2.

The attached drawing illustrates diagrammatically the air conditioning system employed in a building structure containing a large number of areas to be conditioned. The air conditioning system includes a central station designated generally at 2 to treat the air supplied to the areas to be conditioned. The central station 2 includes a filter 3, a preheating coil 4, sprays 5, a cooling coil 6 and a heating coil 7. A fan 8 draws air from the exterior of the structure through the various members of the central station. It will be appreciated that return air in any desired proportion may be mixed with the fresh air and treated in the central station if desired.

Fan 8 passes conditioned air into a header 9, branches 10 leading off from header 9 to the areas 11 to be conditioned. Room units 12, 12', 12" are disposed in the areas to be conditioned, and are connected to branches 10 by run-outs 13. Dampers 14 are placed in the run-outs 13 as shown to permit the volume of conditioned air passing into any unit to be varied in accordance with conditions within the area being treated. It will be understood that the dampers 14 may form a part of the unit if desired. Units 12, preferably, are of the well-known induction type; units 12' may be wall outlets of any desired type. Units 12" may be ceiling units of any well-known type.

Dampers 14 may be actuated manually or automatically as desired. As shown, dampers 14 are actuated automatically by a thermostat 15 in response to variation in temperature in the area being conditioned.

Dampers 16 are placed, preferably, in header 9 to regulate the volume of treated air directed into the header by fan 8. Dampers 16 may be placed in any position between the first branch and the fan, if desired, and may be regulated by means of a pneumatic motor 17 as hereinafter described.

The duct work of the system (header 9, branches 10, run-outs 13) is designed in accordance with the principle of static pressure regain for most effective results. By the use of this method, the velocity in the header is reduced at each branch so that the recovery in static pressure due to this reduction will exactly offset the friction in the succeeding section. There is, of course, a pressure drop in each branch due to the fitting; the branches too are designed so that the velocity is reduced at each take-off so that the recovery in static pressure due to this reduction will substantially offset the friction in the succeeding section. The method of designing duct work in accordance with the principle of static pressure regain is well-known so that detailed description of such method is not required. Reference, however, is made to the text-book entitled "Modern Air Conditioning, Heating and Ventilating" by Carrier, Cherne and Grant, published by Pitman Publishing Company, 2d edition, and particularly pages 254 to 256 thereof, for a more detailed description of such method. An advantage in so designing the duct work resides in the fact that higher velocities of conditioned air may be employed.

It will be appreciated that in any air conditioning system in which provision is made for variation in supply of conditioned air to any area that the problem of maintaining desired static pressure in the branches is extremely difficult. Decrease in the volume of air supplied in any area has a tendency to increase the duct work pressure with resulting increases in noise level and the supply of greater volumes of air than desired at greater velocity to the remaining areas of the system so that it is well nigh impossible to maintain comfortable conditions in such areas. It will be appreciated when changes in the volume of air supplied to a number of areas are made to compensate for change in sensible heat loads in those areas, as occurs frequently in large structures, the difficulty of maintaining satisfactory operation of the air conditioning system is increased.

Even though the duct work be designed in accordance with the principle of static pressure regain it is impossible or impracticable in commercial practice to maintain the same static pressure in the branches as in the header. Thus, systems employed heretofore to maintain a desired static pressure in the branches were expensive and ineffective.

The present invention provides an inexpensive and effective static pressure regulating system which responds immediately to change in static pressure in the branches to actuate dampers 16 to vary the volume of treated air passing into the header 9 and thence to the branches 10. The static pressure regulating system includes a sensing probe 20 placed in header 9 to reflect a pressure in the header substantially equivalent to static pressure in a branch at any given point. Since the duct work is designed in accordance with the principle of static pressure regain, it will be understood any change in static pressure at the given point reflects an average change or an approximate change in static pressure in other branches.

Probe 20 consists of a tube 21 closed at its end extending within the header 9 and having its opposite end connected to a pressurestat 22 by an air line 23. An orifice or opening 24 is formed in the wall of the tube adjacent its closed end so that pressure in the header reflected by the probe may be applied to pressurestat 22, as hereinafter explained. A rod 25 extends longitudinally of the tube and tangentially to the orifice to cause a reduction in pressure at the orifice.

If the probe 20 is inserted in the header 9 with the orifice 24 facing upstream (toward the fan 8), the total pressure or sum of velocity pressure and static pressure is measured. As the tube is rotated, the velocity component of total pressure decreases until it is zero and further rotation results in a negative component. This condition can be expressed by the equation $$P_{pr} = P_s - xP_v$$

in which $P_{pr}$ is pressure measured by the probe in inches of water, $P_s$ is static pressure in the header at the location of the probe measured in inches of water, $P_v$ is velocity pressure in the header at the location of the probe measured in inches of water and $x$ is the ratio of $$\frac{(P_s - P_{pr})}{P_v}$$

If the term $xP_v$ is made equal to the pressure drop from the position of the probe to the point in the branches at which it is desired to control the static pressure, the probe will control the static pressure at the desired point by actuating the damper 16 through pressurestat 22. That is, the probe will then sense a pressure substantially equivalent to the pressure in the branch at the desired point; by actuating the damper 16 through pressurestat 22 the volume of air supplied to the branch will be varied to maintain the desired static pressure in the branch and consequently to maintain substantially constant the volume of conditioned air supplied in any particular area. The probe is adjustable so as to vary the value of $x$ independently of velocity to balance against the pressure loss and is set to reflect a suitable value of $x$ by adjusting the value of the probe pressure under high air flow conditions to the desired static pressure to be maintained in the branches. If the pressure drop through the system is assumed to vary as the square of the system quantity, the same pressure may be obtained at the branches regardless of flow rate.

If it is assumed that damper 16 is open to provide full air quantity and that the dampers 14 in the run-outs 13 are in open position, maximum total air flow results. If some of the area units are throttled by means of dampers 14, then the air flow will decrease, reducing $xP_v$ so that the probe senses such condition and actuates the damper 16 to reduce the volume of air passing into the header thereby producing a lower static pressure at the probe corresponding to the reduced flow rate. By making $xP_v$ equal to the pressure loss from the probe location in the header to a desired location in a branch designated at E, the static pressure in the branch is controlled by the probe located in the header. The probe serves to maintain a desired branch pressure so that the air volume supplied to a particular area is unaffected by change in volume of air supplied to other areas. This is based on the assumption that the branches are throttled proportionately. Where the air from one branch is throttled more or less than from the other branches, there will be a slight variation in static pressure in the branch but this variation will be minimized. Use of my invention however will tend to bring the system into balance whenever a change in air flow occurs.

The probe 20 is placed in header 9 at a point where the velocity is high, preferably, between a point approximately ten header diameters downstream of damper 16 and a point one header diameter upstream of the take-off at the second branch and at least three header diameters downstream of the first take-off (first branch).

With all run-outs open and the system balanced at 100% air flow in the header, the probe is rotated in a clockwise or counter-clockwise direction depending on which side of the orifice 24 the rod 25 is placed, until the pressure measured by the probe is equal to the static pressure as measured down one of the middle risers (at point E). The probe is then secured in place against inadvertent further rotation. Preferably, the orifice 24 is placed at an angle within the range of 30° to 60° from the direction of air flow through the header.

Pressurestat 22, preferably, is of the well-known inverted bell type in which two bells 30, 31 are inverted in a liquid bath 32. The bells are connected to a pivoted lever 33 to move an end of the same toward or from a nozzle 34. Preferably, a bellows 28 is adapted to exert pressure against lever 33 in opposition to the pressure exerted by bell 30. Bellows 28 is connected to a solar compensator, as hereinafter described and serves in effect to reset pressurestat 22 in accordance with the effects of solar radiation. An adjustable spring 29 also exerts force against lever 33 as shown.

A source of compressed air (not shown) is provided which serves to provide desired air pressure through main air line 35 to the controls. Branch air lines 36, 37 provide desired air pressure to motor 17. A secondary air line 38 connects line 37 to the nozzle 34 of pressurestat 22. A restriction 39 is placed in line 37 to assure application of desired air pressure to motor 17 and through secondary line 38. Line 23 connects probe 20 and bell 30 of pressurestat 22. Bell 31 is open to the atmosphere. Thus as pressure reflected by probe 20 increases, lever 33 is moved toward nozzle 34, thus increasing pressure in line 38 and increasing the pressure applied to motor 17 to actuate damper 16 to move toward a closed position to descrease the volume of air passing into header 9. Likewise, as pressure reflected by probe 20 decreases, the lever 33 is moved from nozzle 34 permitting air to bleed from line 38 actuating motor 17 in the reverse direction to move damper 16 toward an open position.

Preferably, a solar compensator 45 is provided to reset pressurestat 22 in accordance with solar radiation in the areas being conditioned. The solar compensator is more fully described and claimed in copending application now Patent No. 2,836,364, granted May 27, 1958.

The solar compensator 45 includes a thermostat 46 containing a nozzle 47 connected by branch air line 48 to line 40 thence to line 35. A pivoted lever 49 opens and closes nozzle 47. Lever 49 is actuated by means of bellows 50, 51 connected by capillary tubes 52, 53 to bulbs 54, 55, bulb 54 being placed in a solar radiation box 56 so that it senses a temperature due to solar radiation and temperature of exterior air while bulb 55 is suspended below the box so that it reflects exterior air temperature. The thermostatic systems contain the usual liquid "fill." If desired, storage material 57 may be placed in box 56 to provide a time lag similar to the time lag caused by heat storage in the areas being conditioned. Thermostat 46 is actuated in response to the temperature difference between the two thermostatic systems.

When the nozzle 47 of thermostat 46 is closed, air pressure increases in secondary line 48 which connects the bellows 28 of pressurestat 22 to the solar compensator, thus increasing the pressure applied against lever 33 in opposition to the pressure applied thereagainst by inverted bell 30 to urge lever 33 to move away from nozzle 34 of thermostat 22 thereby resetting the pressurestat in accordance with the solar radiation as reflected by compensator 45. Nozzle 34 bleeds air from line 38 decreasing the pressure applied to motor 17 to actuate damper 16 to move toward an open position.

It will be appreciated that it is not necessary to employ the solar compensator 45 with the static pressure regulating system since the static pressure regulating system may be employed without any or with other types of solar compensators. The solar compensator serves in effect to reset or change the control point of the static pressure regulating system in accordance with changes in solar radiation. I have found that an electrical type of solar compensator may be employed with satisfactory results.

Considering the operation of the air conditioning system of the present invention, exterior or fresh air is drawn into central station 2, filtered, cooled or heated, dehumidified or humidified as required and passed into the header 9 by fan 8. Change in pressure in header 9 caused by decreasing or increasing supply of conditioned air to various areas, is sensed by probe 20 reflecting a pressure substantially equivalent to static pressure in a riser at point E. The change in pressure sensed by probe 20 affects pressurestat 22 to actuate motor 17 to move the damper 16 thus decreasing or increasing the volume of conditioned air passing to header 9 thereby maintaining a desired static pressure in the branches 10 to maintain substantially constant the volume of conditioned air supplied to a particular unit regardless of adjustments at other units during operation of the system. In all cases the static pressure regulating system maintains the desired static pressure in the branches 10 to keep the system in balance without regard to discontinuance in supply of conditioned air to any or a number of the various areas being treated.

The present invention provides an air conditioning system in which desired static pressure may be maintained in the branches even though the supply of conditioned air to various areas being treated is discontinued. The static pressure regulating system is inexpensive in cost and simple to install thus permitting the system to be easily balanced at installation. Maintenance of desired static pressure in the risers is automatic so that attention of the operator is not required. The sensing probe is highly accurate while being extremely simple and inexpensive. Use of this regulating system permits the volume of conditioned air supplied to any particular unit or outlet to be maintained substantially constant regardless of adjustments to other units or outlets during operation of the air conditioning system.

While I have described a preferred embodiment of the invention, it will be understood the invention is not limited thereto since it may be otherwise embodied within the scope of the following claims.

I claim:

1. A sensing member for use in a static pressure regulating system which comprises a rotatable hollow tube having a closed end, said tube having an orifice in its wall adjacent one end, and a member secured to the tube longitudinally thereof and tangentionally to the orifice therein to cause a reduction in pressure at the orifice.

2. In a static pressure regulating system for use in air conditioning systems designed in accordance with the principle of static pressure regain, the combination of a sensing member to be placed in the header of the system to reflect a pressure substantially equivalent to static pressure at a predetermined point of a branch of the system, actuating means connected to the sensing member, means to vary the volume of air supply to the header, said actuating means actuating the volume-varying means responsive to change in pressure in the header reflected by the sensing member to maintain the desired static pressure in the branches of the system, said sensing member comprising a closed hollow tube having an orifice adjacent its end extending within the riser, and a member placed on the tube longitudinally thereof and tangentially to the orifice to cause a reduction in pressure at the orifice.

3. In a static pressure regulating system for use in air conditioning systems designed in accordance with the principle of static pressure regain, the combination of a sensing member to be placed in the header of the system to reflect a pressure substantially equivalent to static pressure at a predetermined point of a branch of the system, actuating means connected to the sensing member, reset means operatively associated with the actuating means responsive to variation in solar radiation, means to vary the volume of air supply to the header, said actuating means actuating the volume-varying means responsive to change in pressure in the header reflected by the sensing member to maintain the desired static pressure in the branches of the system, said sensing member comprising a closed hollow tube having an orifice adjacent its end extending within the riser, and a member placed on the tube longitudinally thereof and tangentially to the orifice to cause a reduction in pressure at the orifice.

References Cited in the file of this patent

UNITED STATES PATENTS

| 1,262,225 | Meyer | Apr. 9, 1918 |
| 1,419,316 | Sherbondy | June 13, 1922 |
| 1,446,618 | Darley | Feb. 27, 1923 |

(Other references on following page)

UNITED STATES PATENTS

| | | |
|---|---|---|
| 1,698,191 | Gaines | Jan. 8, 1929 |
| 2,055,988 | Stacey et al. | Sept. 29, 1936 |
| 2,109,512 | Stacey | Mar. 1, 1938 |
| 2,134,257 | Leutwiler | Oct. 25, 1938 |
| 2,223,287 | Kingsland | Nov. 26, 1940 |
| 2,274,774 | Chambers | Mar. 3, 1942 |
| 2,327,664 | Otis | Aug. 24, 1943 |
| 2,609,183 | Fitzgerald | Sept. 2, 1952 |
| 2,710,724 | McMahon | June 14, 1955 |

FOREIGN PATENTS

| | | |
|---|---|---|
| 149,808 | Australia | Aug. 23, 1951 |